United States Patent [19]

Budano, II et al.

[11] Patent Number: 4,741,074
[45] Date of Patent: May 3, 1988

[54] DETACHABLE BELT CLIP SUITABLE FOR AUTOMATED ASSEMBLY

[75] Inventors: Joseph A. Budano, II, Plantation; Anthony M. Potts, Lauderdale Lakes, both of Fla.

[73] Assignee: Motorola, Inc., Schaumburg, Ill.

[21] Appl. No.: 1,078

[22] Filed: Jan. 7, 1987

[51] Int. Cl.⁴ .............................................. A45F 5/02
[52] U.S. Cl. ....................... 24/3 J; 24/458; 24/510; 224/252; 224/269; 403/155
[58] Field of Search ......................... 16/259, 380, 386; 248/229, 316.5, 231.8, 222.2, 221.3; 224/252, 269; 455/351; 403/155, 326; 24/3 H, 3 J, 3 L, 67.7, 489, 499, 500, 509, 510, 457, 458

[56] References Cited

U.S. PATENT DOCUMENTS

| | | | |
|---|---|---|---|
| 491,011 | 1/1893 | Dom | 24/67.7 |
| 702,523 | 6/1902 | Yawman | 24/67.7 |
| 1,175,550 | 3/1916 | Murray | 16/380 X |
| 2,460,162 | 1/1949 | Alsop et al. | 24/510 X |
| 2,500,032 | 3/1950 | Helberg | 24/67.7 |
| 3,695,568 | 10/1972 | Hogrebe | 248/222.2 |
| 4,083,481 | 4/1978 | Selinko | 224/255 |
| 4,299,344 | 11/1981 | Yamashita et al. | 455/351 X |
| 4,619,428 | 10/1986 | Bailey | 248/221.3 X |
| 4,635,836 | 1/1987 | Mooney et al. | 224/269 X |
| 4,641,370 | 2/1987 | Oyamada | 455/351 X |

FOREIGN PATENT DOCUMENTS 2312315 9/1974 Fed. Rep. of Germany ...... 403/155

Primary Examiner—Kenneth J. Dorner
Assistant Examiner—James R. Brittain
Attorney, Agent, or Firm—Martin J. McKinley; Joseph T. Downey; Daniel K. Nichols

[57] ABSTRACT

For proper pre-assembly alignment of the hinge plate holes (e.g., 120b and 136b), stops (e.g., 140a) are engaged in notches (e.g., 119b). A hinge pin (128) is then inserted into the aligned holes to attach the clip (130) to the base plate (102). The pin is locked in position by a spring finger (204) that forcibly engages the semicircular wall (202) of one hinge plate hole (120a) into a groove (304) on the pin. A coil spring (122) is unloaded during assembly because its free ends (124a and 124b) project through apertures (116a and 116b) in the base plate. After assembly, the spring is pre-loaded by engaging its free ends under tabs (116a and 116b) that project into the apertures. The base plate has a "U" shaped bracket (502) at one end and a tab (112) on a torsion bar (110) at the other end to attach the assembly to a radio housing.

6 Claims, 4 Drawing Sheets

DETACHABLE BELT CLIP SUITABLE FOR AUTOMATED ASSEMBLY

BACKGROUND OF THE INVENTION

This invention relates to the field of belt or pocket clips for attaching a battery powered radio to a user's article of clothing, and, more particularly, to such a belt clip that is suitable for automated manufacture.

Portable radio transceivers and selective call paging receivers ("pagers") are frequently provided with a belt or pocket clip to secure the device to an article of clothing worn by the user. These prior art belt clips were designed to be manually assembled and present difficult problems when automated assembly is attempted.

To assemble a clip to a radio housing, a typical prior art belt clip requires manual alignment (usually visually or by "feel") of hinge pin holes of the clip with hinge pins holes of the housing. To complicate the problem, the hinge pin holes must be aligned while simultaneously preloading (e.g., compressing or stretching) a spring.

Next, a pin must be aligned with and inserted into the hinge pin holes. A prior art belt clip typically uses a rolled pin which is difficult to align because, prior to insertion, the diameter of the pin is larger than the diameter of the holes. Accordingly, the pin is not self-aligning and insertion resistance is encountered over the entire length of the pin. Accordingly, assembly of the prior art belt clip requires that at least three functions be performed simultaneously: the alignment of the hinge pin holes, the preloading of the spring, and the alignment and insertion of the pin.

These manual assembly problems make automated assembly of the prior art pocket clip even more difficult. It would be desirable, therefore, if a new pocket clip could be designed that would be more suitable for automated assembly.

SUMMARY OF THE INVENTION

Briefly, the invention is a belt clip assembly that can be attached to a portable radio receiver. The belt clip assembly is suitable for automated manufacture and includes a base plate, a clip and means for movably attaching the clip to the base plate. A spring means is included that has a first no-load position and a second pre-load position. The spring means forces the clip against the base plate when in the pre-load position. To attach the clip to the base plate, the spring means is positioned in the no-load position during attachment. After attachment, the spring means is moved to the pre-load position.

DESCRIPTION OF THE PREFERRED EMBODIMENT

Figure 1:
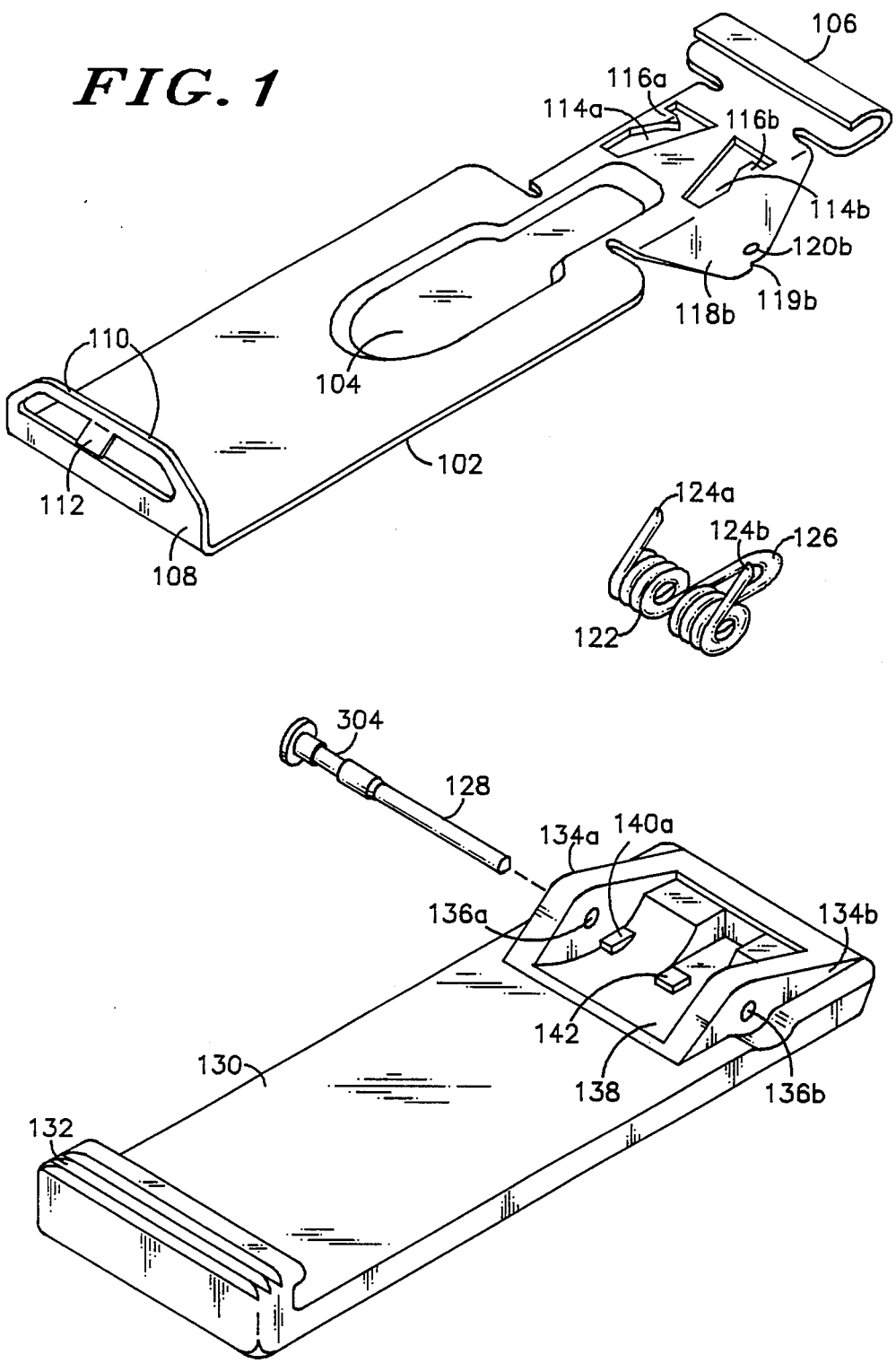
FIG. 1 is an explosed perspective view of the belt clip assembly of the present invention.

In FIG. 1, an exploded perspective view of the belt clip assembly of the present invention is illustrated. Referring to this figure, a mounting bracket or base plate 102 includes an embossment 104 to improve rigidity. One end of base plate 102 includes a "U" shaped bracket 106 while the other end includes an "L" shaped bracket 108 into which a torsion bar 110 is formed. A latch 112 is attached to torsion bar 110 and projects downward slightly from bracket 108.

Base plate 102 includes two spring apertures 114a and 114b into which two spring retaining tabs 116a and 116b project. These will be described in greater detail later in connection with FIG. 4.

Base plate 102 also incorporates two hinge plates 118a and 118b (only 118b is visible in FIG. 1) that are positioned substantially perpendicular to the main body of the base plate. Each hinge plate 118a and 118b respectively includes a hole 120a and 120b for receiving a pin (only 120b is visible in FIG. 1). Hinge plates 118a and 118b also respectively incorporate corner notches 119a and 119b (only 119b is visible in FIG. 1).

All the aforementioned parts of base plate 102 are integrally formed with the base plate by stamping and forming a 0.75 mm thick sheet of #410 heat treatable stainless steel, and then heat treating.

A torsion coil spring 122 has free ends 124a and 124b and a "U" shaped joint 126 connecting two adjacent turns of the spring. Spring 122 is preferably formed from 1.45 mm diameter #301 stainless steel.

Spring 122 is specifically designed for automated assembly. The outside diameter of "U" shaped joint 126 is substantially less than the inside diameter of the axial hole through the coil spring. Therefore, prior to assembly, the coil springs can be easily separated from one another by machine because "U" shaped joint 126 cannot be jammed into the axial hole of another coil spring. Similarly, if "U" shaped joint 126 were substantially larger than the inside diameter of the coil spring, the same benefits would result.

"U" shaped joint 126 also preferentially weights coil spring 122 such that when the springs are placed on a vibrating table, as is typically used in automated assembly, a vast majority of the springs will fall into a preferred position wherein "U" shaped joint 126 lies flat on the table. This facilitates automated assembly by limiting the number of directions that a robotic arm must be able to move in order to orient the spring it has just picked up into the proper position for placement in the belt clip assembly.

A pin 128 is preferably formed from #303 stainless steel. Pin 128 will be described in greater detail below in connection with FIG. 3.

A belt clip 130 is preferably molded from ABS plastic, for example, plastics sold under the LEXAN trademark. An irregular grip portion 132 at one end of belt clip 130 contacts base plate 102 and is suitable for clamping an article of clothing between the pocket clip and the base plate. Pocket clip 130 also incorporates two hinge plates 134a and 134b which are integrally molded with the pocket clip. Hinge plates 134a and 134b also include holes 136a and 136b into which pin 128 is inserted. Belt clip 130 has a concaved recessed portion 138 for receiving spring 122 and includes stops 140a and 140b (only stop 140a is visible in FIG. 1) that are positioned adjacent hinge plates 134a and 134b.

During assembly, notches 119a and 119b are respectively positioned against stops 140a and 140b to align holes 120a, 120b, 136a and 136b, thereby facilitating assembly of the belt clip to the base plate. Belt clip 130 also includes a boss 142 that is inserted between two adjacent turns of spring 122 (the two turns that are joined by "U" joint 126). Prior to assembly of base plate 102 to belt clip 130, boss 142 correctly positions and holds spring 122 to the belt clip.

Figure 2:
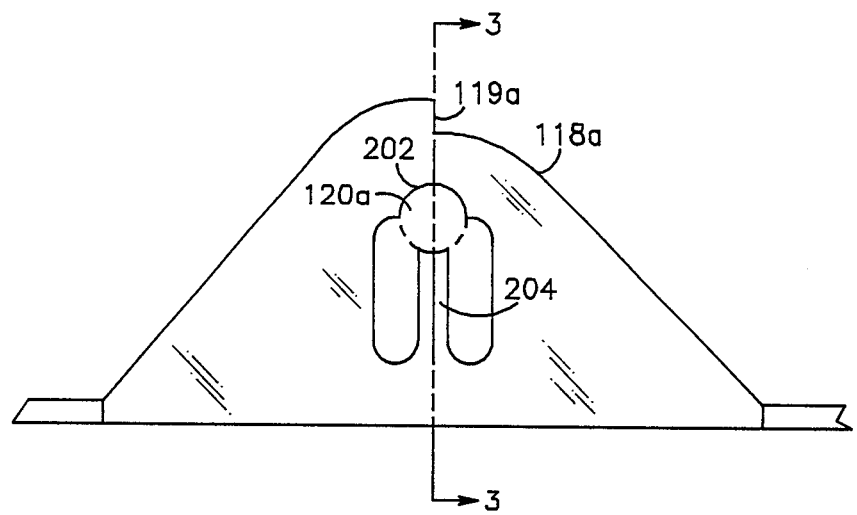
FIG. 2 is a plan view of the hinge plate that incorporates the means for retaining the pin.

In FIG. 2, a detailed plan view of hinge plate 118a is illustrated. Hole 120a has a semicircular shaped wall 202 and an integrally formed spring finger 204 that projects to the perimeter of hole 120a. The diameter of hole 120a is preferably 2.36 mm.

Figure 3:
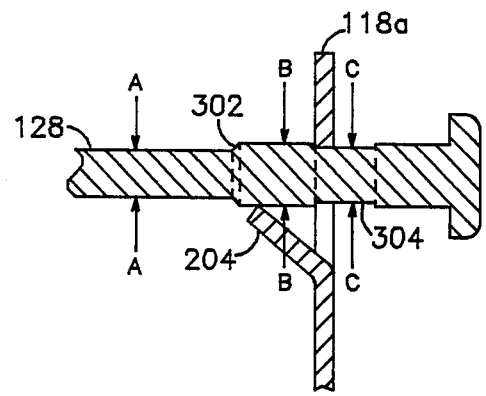
FIG. 3 is a detailed sectional view of the hinge plate and pin as seen along line 3—3 of FIG. 2.

In FIG. 3, a cross sectional view of the hinge plate of FIG. 2 is illustrated. Referring to this figure, pin 128 has a chamfer 302 and a groove 304. The diameter of pin 128 is 2.29 mm at "A", 2.54 mm at "B", and 2.41 mm at "C". During insertion, the end of the pin is first inserted into hole 136a of belt clip 130, then into holes 120a and 120b of base plate 102 and, finally, into hole 136b of the belt clip. Pin 128 has sufficient length to the left of chamfer 302 such that the pin is completely inserted into the last hole (136b) before chamfer 302 contacts hinge plate 118a. This facilitates automated assembly because the pin is completely inserted into all four holes before any resistance is encountered.

As pin 128 is further inserted into the four holes, chamfer 302 contacts spring finger 204 and deflects it to the left (see FIG. 3). Once deflected, spring finger 204 then pushes up on pin 128 such that the pin contacts semicircular wall 202 of hinge plate 118a. Upon further insertion of pin 128 into the holes, the semicircular wall then engages groove 304 and pin 128 is locked into position.

Figure 4:
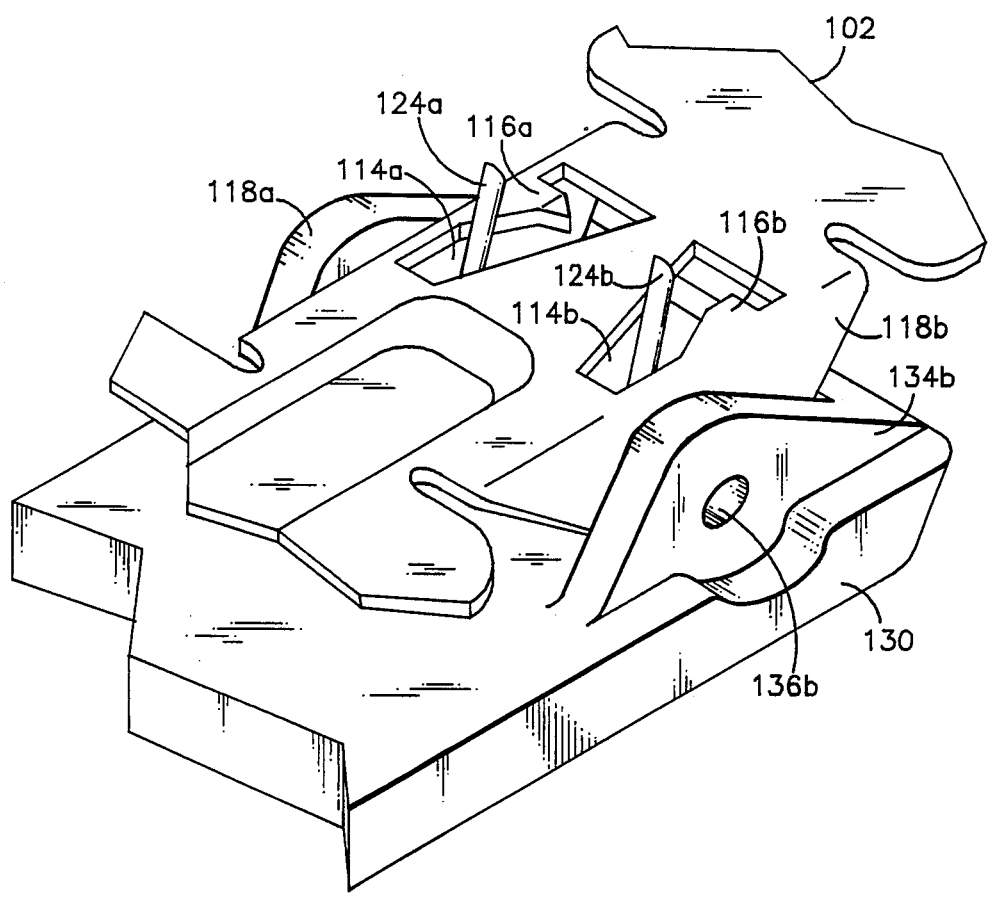
FIG. 4 is a detailed perspective view of the base plate apertures and spring retaining tabs illustrating the free ends of the spring in the no-load position.

In FIG. 4, a detailed perspective view of base plate apertures 114a and 114b and spring retaining tabs 116a and 116b is illustrated. Spring 122 can be placed in two different positions: a first no-load position whereby no force is generated to push belt clip end 132 against base plate 102, and a pre-load position whereby spring 122 forces the belt clip end against the base plate. FIG. 4 illustrates the no-load position. In the no-load position, spring ends 124a and 124b project respectively through apertures 114a and 114b. This is the position that spring 122 is placed in during automated assembly when base plate 102 is being attached to pocket clip 130. After the base plate has been assembled to the pocket clip and pin 128 has been inserted into the appropriate holes, pressure is applied from a robotic arm to spring ends 124a and 124b to force the ends down through apertures 114a and 114b. When spring ends 124a and 124b have been forced below tabs 116a and 116b, the spring ends lock underneath these tabs. This is the pre-load position wherein spring tension is now applied to the base plate and the pocket clip. Thus, automated assembly is simplified because spring 122 does not have to be compressed while assembling the pin into the hinge plate holes.

Figure 5:
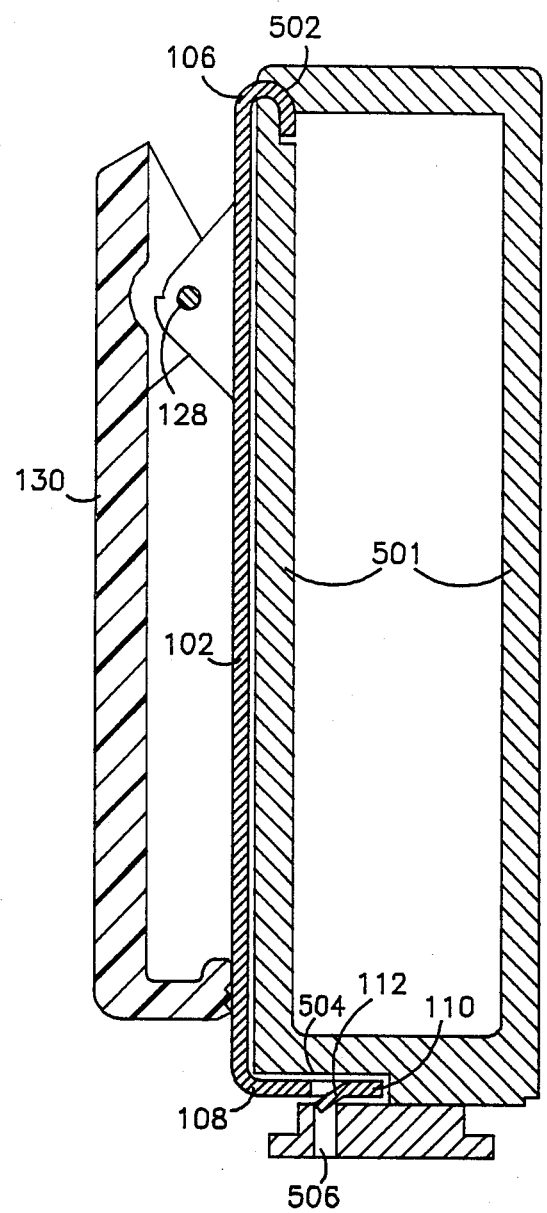
FIG. 5 is a cross sectional view of the belt clip assembly illustrating the attachment of the assembly to a portable radio receiver.

FIG. 5 is a sectional view of the belt clip assembly showing its attachment to a portable radio housing 501. Referring to this figure, "U" shaped bracket 106 is first inserted into a mating slot 502 formed in housing 501. Next, torsion bar 110 and latch 112 are inserted into a corresponding slot 504. During initial insertion, torsion bar 110 twists, flattening latch 112 into the plane of bracket 108. Upon full insertion, latch 112 encounters notch 506 and springs downward locking the belt clip assembly to housing 501.

To remove the belt clip assembly, a screwdriver is inserted into notch 506, forcing latch 112 up. A slight outward force is applied to the screwdriver which slides latch 112 beyond the edge of notch 506. This unlocks the belt clip assembly which can then be easily removed from the housing.

We claim as our invention:

1. A belt clip assembly attachable to a portable radio receiver and suitable for automated manufacture, said assembly comprising in combination:
   a base plate including means to hold a spring in one of two positions, specifically no-load and pre-load positions;
   a clip;
   means for moveably attaching said clip to said base plate; and
   a spring for forcing said clip towards said base plate when said spring is held in said pre-load position;
   whereby, to attach said clip to said base plate, said spring is positioned in said no-load position during and throughout attachment, the said spring is moved to said pre-load position after attachment.

2. The assembly of claim 1, wherein:
   said springs includes a coil and a free end;
   said base plate includes an aperture through which said free of said spring projects when said springs is positioned in said no-load position; and
   said base plate further includes a tab projecting into said aperture for engaging said free end of said spring when said spring is positioned in said pre-load position.

3. The assembly of claim 1, wherein said attaching means includes:
   a pin having a groove;
   first and second hinge plates, one of said hinge plates being attached to said base plate and the other attached to said clip, each of said hinge plates having a hole into which said pin is inserted, said hole of said first hinge plate having a semicircular wall and a spring finger for forcibly engaging said semicircular wall in said groove.

4. The assembly of claim 1, further comprising:
   first and second hinge plates each having a hole, one of said hinge plates being attached to said base plate and the other attached to said clip, said first hinge plate having a notch; and
   a stop, suitable for engaging said notch, said stop being positioned adjacent said second hinge plate;
   whereby, during assembly of said base plate to said clip, said holes in said hinge plate are aligned when said stop is engaged with said notch.

5. The assembly of claim 1, wherein:
   said spring includes a coil; and
   said spring includes a boss inserted between two adjacent turns of said coil spring;
   whereby, during assembly of said base plate to said clip, said spring is appropriately positioned and temporarily secured to said clip by said boss.

6. The assembly of claim 1, further comprising:
   a torsion bar attached to said base plate; and
   a latch attached to said torsion bar, for engaging a mating slot in said portable receiver.

* * * * *

UNITED STATES PATENT AND TRADEMARK OFFICE
CERTIFICATE OF CORRECTION

PATENT NO.  : 4,741,074
DATED       : May 3, 1988
INVENTOR(S) : Joseph A. Budano, II and Anthony M. Potts It is certified that error appears in the above-identified patent and that said Letters Patent is hereby corrected as shown below:

In Claim 1, line 14, delete "the" and insert -- then --.

In Claim 2, lines 2 and 4, delete "springs" and insert -- spring --.

In Claim 2, line 4, after "free", insert -- end --.

In Claim 5, line 3, delete "spring" and insert -- clip --.

In Claim 6, line 4, after "portable" insert -- radio --.

Signed and Sealed this

Fourth Day of October, 1988

Attest:

DONALD J. QUIGG

Attesting Officer

Commissioner of Patents and Trademarks